United States Patent [19]

Riggs et al.

[11] Patent Number: 5,545,351
[45] Date of Patent: Aug. 13, 1996

[54] USE OF STEARIC ACID ESTERS OF POLYPROPYLENE GLYCOL TO CONTROL FOAM

[75] Inventors: William F. Riggs, Humble; Thomas A. Wheeler, Houston, both of Tex.

[73] Assignee: Baker Hughes Incorporated, Houston, Tex.

[21] Appl. No.: 530,528

[22] Filed: Sep. 19, 1995

[51] Int. Cl.$^6$ .............................. B01D 43/00; B03D 1/06
[52] U.S. Cl. ........................... 252/321; 209/166; 209/167
[58] Field of Search ............................ 252/321; 209/166, 209/167

[56] References Cited

U.S. PATENT DOCUMENTS 3,837,489  9/1974  Michalski et al. ...................... 209/167

OTHER PUBLICATIONS

CA 112:136814 Chemical Abstract of CZ 277788 B6 (14 Apr. 1993).

*Primary Examiner*—David Brunsman
*Attorney, Agent, or Firm*—Rosenblatt & Redano, P.C.

[57] ABSTRACT

Stearic acid monoesters and diesters of polypropylene glycol (PPG), together with a hydrocarbon diluent, give exceptional defoaming performance in mineral processing streams over defoaming compositions made with esters of other fatty acids. The defoaming ability of compositions made from stearic acid esters of PPG is further enhanced by the inclusion of a relatively small amount of a non-ionic dispersing surfactant.

20 Claims, No Drawings

USE OF STEARIC ACID ESTERS OF POLYPROPYLENE GLYCOL TO CONTROL FOAM

FIELD OF THE INVENTION

The invention relates to methods and compositions to control foams produced in mineral processing streams, and more particularly, in one embodiment, to methods for controlling and reducing foams using stearic acid esters of polypropylene glycol or propoxylated stearic acid.

BACKGROUND OF THE INVENTION

In the recovery of ore values, there are often process streams which may foam to an undesirable extent. For example, in recovering various metal values selectively from other values via froth flotation, a foam may occur which interferes with the ore value recovery. However, problems with foam may occur which impedes the mineral separation process. Additionally, problems with overfrothing may occur in many other kinds of streams. For example, industrial and municipal waste streams may also have foam control difficulties.

There are various ways for controlling foam, including altering or changing equipment to reduce turbulence which may be contributing to foaming. However, it will be appreciated that this method would likely be capital intensive and thus disfavored. If surfactants are used in a mineral processing stream, they could be removed or their proportion reduced since the surfactants may be stabilizing the foam bubbles. For example, hydrophobic solids can be used to lessen the effect of the foam stabilizing surfactants. The hydrophobic solids are attracted to the bubble interface where they absorb the surfactants and prevent them from stabilizing the bubbles.

Thirdly, a chemical that forms a monolayer film on the liquid, such as water, to increase its surface tension can effectively prevent a foam from forming. Lastly, a fourth technique is to increase the rate at which the bubbles coalesce to promote foam collapse. The goal is to dissipate the foam faster than it can form. Antifoaming compositions reduce surface and bulk viscosities, allowing bubble interface drainage to happen faster than the foam can be formed.

U.S. Pat. No. 3,837,489 describes an antifoam and process for the separation of molybdenum values associated with predominantly copper ores of the sulfide type. The antifoam, which is primarily directed to laundering or cleaning stages in the moly cycle, consists of a utilization of 1–60 ppm of a polyoxyethylene glycol ester in a hydrocarbon diluent per ton of ore. The oxyethylene fraction has a value of about 100–2,000 and an optimum value of about 400 and the fatty acid fraction is selected from $C_{14}$–$C_{22}$ acids. A preferred antifoam of this patent is polyethylene glycol 400 dioleate (P. E. G. 400 dioleate) in kerosene or isoparaffin oil as the diluent. HLB values for the P. E. G. antifoam range from 5–12 with a preferred value of 5–10 for the dioleate.

However, it will be appreciated that while one composition may be suitable for controlling foam in some processes, that there are an appreciable number of variables which might make it unsuitable for a similar, but somewhat different process. It would thus be desirable if additional defoaming compositions could be developed which would have utility for one or more mineral processing streams.

SUMMARY OF THE INVENTION

Accordingly, it is an object of the present invention to provide a defoaming composition made from readily available materials.

It is another object of the present invention to provide a composition for controlling foam in mineral processing streams that can be applied using conventional equipment.

In carrying out these and other objects of the invention, there is provided, in one form, a method of reducing foam in a mineral separation process stream comprising adding to the mineral separation process stream a defoaming composition having a stearic acid monoester or diester of polypropylene glycol (PPG); and a hydrocarbon diluent. A dispersing surfactant may be optionally present.

DETAILED DESCRIPTION OF THE INVENTION

It has been discovered that a stearic acid monoester and/or diester of polypropylene glycol (PPG) can produce exceptional defoaming compositions when used together with a hydrocarbon diluent. For the purposes of this disclosure, it will be appreciated that the defoaming compositions of this invention can be used both as antifoaming reagents used to prevent foams not yet formed, and as defoamers are used to eliminate or reduce foams already present. That is, the term "defoaming compositions" will be used to encompass both general applications.

It is will be appreciated that esters of fatty acids have been used in antifoams, as noted in U.S. Pat. No. 3,837,489, discussed previously. However, it has been surprisingly found that the combination of stearic acid and polypropylene glycol (PPG) gives defoaming compositions with exceptional defoaming ability that could not have been predicted from the prior art. In this regard, stearic acid is considered to be a critical saturated acid for the compositions of this invention.

Further, the compound having hydroxyl functionality to be reacted with the stearic acid must be a PPG. Preferably, the PPG has a molecular weight based on the hydroxyl equivalent weight, of from about 320 to 700. It is especially preferred that the molecular weight range from about 420 to 500.

The production of a stearic ester with PPG can be achieved by any known technique. One such technique that was extensively used in our study was the esterification of PPG with stearic acid. The PPG and the stearic acid are charged into a glass or other type reactor along with a suitable catalyst such as, but not limited to Fascat 4201 or 4200 or dodecylbenzenesulfonic soft acid (DDBSA). The charge is heated to 175° to 205° C. and reacted at atmospheric pressure for 16 to 24 hours until the desired hydroxyl number of 75 to 90 for the monoester of 0 to 5 for the diester is reached.

Another known method is to propoxylate stearic acid. The stearic acid is charged into a Parr pressure reactor and heated to 115° to 135° C. Propylene glycol is added intermittently in small dosages nad reacted 20 to 24 hours at a pressure of 5 to 60 psig until the above-listed hydroxyl numbers are attained.

A molar ratio of stearic acid to PPG of about 1:1 is expected to give primarily the stearic acid monoester of PPG, whereas a molar ratio of about 2:1 (molar functionality equivalent ratio of about 1:1) of stearic acid to PPG is expected to give primarily the stearic acid diester of PPG. Of course, the proportion of such reaction products will depend on the completeness of the reaction and will vary.

The defoaming composition requires two components, the ester discussed previously, and a hydrocarbon diluent. The hydrocarbon diluent may include, but is not limited to, mineral oil (MO), cycloparaffinic, isoparaffinic and normal paraffinic hydrocarbons, aromatic naphthalene solvents, terpenic solvents, alpha-olefins, D-limonene, kerosene, mineral seal oil, and alcohols of at least ten carbon atoms. In general, any relatively inexpensive hydrocarbon that does not interfere with the action of the ester component or the process stream being treated may be used. The proportion of ester to hydrocarbon diluent ranges from about 90/10 to about 20/80 by weight, preferably from about 60/40 to about 40/60. In one embodiment of the invention, the stearic acid monoester or diester of PPG is present in a proportion of about 90 to 20 wt. %, the hydrocarbon diluent is about 20 to 70 wt. %, and the optional dispersing surfactant is about 0 to 20 wt. %.

An optional ingredient in the defoaming composition is a surfactant that helps disperse the defoaming components. Suitable dispersing surfactants include, but are not limited to primary and secondary alcohols having from about 10 to about 16 carbon atoms that have been alkoxylated, such as with 7 to ]4 moles of either ethylene oxide (EO), propylene oxide (PO), or mixtures thereof. One particular non-ionic surfactant that is suitable is a $C_{10}$–$C_{16}$ alcohol ethoxylate. Another example can be ethoxylated nonyl phenols with 5 to 12 moles of ethylene oxide. If a non-ionic surfactant is used, in one embodiment, the proportion in the defoaming composition ranges from about 2 to about 20 wt. %, preferably from about 5 to about 10 wt. %.

It will be appreciated that the level of treatment of a particular foaming process stream containing one or more minerals with the defoaming compositions of this invention to reduce or control the foaming cannot be predicted with accuracy. A large number of factors must be taken into consideration, including, but not limited to, the number of different minerals or ores present, concentration of the mineral or ores, nature of the collector being used, temperature and equipment used in the froth flotation process, etc. Within these parameters, a treatment rate of between about 5 and 120 ppm, based on the mineral processing or other stream, is expected to be suitable in some embodiments. In some cases a preferred proportion range is at least 5 to 30 ppm or more.

The invention will be further discussed with respect to the following specific Examples, which are merely intended to additionally illuminate the invention and not limit it in any way.

PREPARATION OF ESTERS

EXAMPLE 1

To a 2 liter reactor were charged 624.1 g (2.7845 equivalents) of a PPG of approximately 400 molecular weight, 373.9 g (1.3883 equivalents) of stearic acid and 2 g of a catalyst (DDBSA; dodecylbenzenesulfonic soft acid) to give 1000 g. The molar equivalent ratio of acid groups to hydroxyl groups was 0.4986. The mixture was heated to a temperature of 190°–196° C. and held there for 15 hours until a final conversion to the stearic acid monoester of PPG of 89.2 % was obtained.

EXAMPLE 2

To a 2 liter reactor were charged 454.1 g (2.026 equivalents) of the PPG of Example 1,543.9 g (2.0195 equivalents) of stearic acid and 2 g of DDBSA catalyst to give 1000 g. The molar equivalent ratio of acid groups to hydroxyl groups was 0.9968. The mixture was heated to a temperature of 190°–198° C. and held there for 18.5 hours until a final conversion to the stearic acid diester of PPG of 87.2% was obtained.

EXAMPLE 3

To a 2 liter reactor were charged 432.6 g (1.9278 equivalents) of the PPG of Example 1, 564.4 g (1.9276 equivalents) of fatty acid tall oil FA1 (Arizona Chemical Company) and 3 g of DDBSA catalyst to give 1000 g. The molar equivalent ratio of acid groups to hydroxyl groups was 0.9999. The mixture was heated to a temperature of 205°–210° C. and held there for 12 hours until a final conversion to the stearic acid diester of PPG of 79.9% was obtained.

EXAMPLE 4

To a 2 liter reactor were charged 603.4 g (2.6889 equivalents) of the PPG of Example 1,393.6 g (1.3443 equivalents) of fatty acid and 3 g of DDBSA catalyst to give 1000 g. The molar equivalent ratio of acid groups to hydroxyl groups was 0.4999 The mixture was heated to a temperature of 193°–205° C. and held there for 18 hours, until a final conversion to the stearic acid monoester of PPG of 86.7% was obtained.

LABORATORY EVALUATION OF DEFOAMING PERFORMANCE OF ESTERS OF EXAMPLES 1–4

The following parameters were used in the defoamer laboratory tests reported in Tables I and II:

1. All products were tested as 60 wt. % solutions in white mineral oil (60 parts defoamer/40 parts mineral oil).

2. D-202 is a commercial defoamer sold by the OrePrep Division of Baker Performance Chemicals, Inc. It is a high molecular weight polyol. It was chosen as the benchmark defoamer for comparison with the inventive defoamers.

3. The inventive defoamers were:
Defoaming
Composition
  Ex. 1 Stearic acid monoester of PPG
  Ex. 2 Stearic acid diester of PPG
  Ex. 3 Fatty acid diester of PPG
  Ex. 4 Fatty acid monoester of PPG 4. Surfactant "A" is a secondary $C_{11}$–$C_{15}$ alcohol ethoxylate nonionic surfactant.

5. Surfactant "B" is a nonyl phenol ethoxylate non-ionic surfactant with 9 moles of EO.

6. D-204 is a new developmental defoamer of OrePrep. It is a blend of stearic monoester of PPG, an aromatic naphthalene solvent as the diluent and a $C_{12}$–$C_{15}$ alcohol ethoxylate non-ionic dispersing aid surfactant.

DEFOAMER TEST PROCEDURE

This test consists of two parts. The first is to determine the kinetics of destruction of the foam with the use of defoaming compositions. The second part is to determine how well these reagents will prevent the foam from reforming. This latter utility has been called an "antifoam".
Apparatus Preparation
The preparation of the apparatus is crucial to the success of the test. The defoamers are very effective even at trace amounts, and when the cylinder is not carefully washed out, the initial froth height will not be attained.

1. Wash inside of a 1 liter column flotation cylinder cell in warm water with brush, using dishwashing detergent. Rinse thoroughly. Wash the cloth filter carefully in warm water.
2. Attach the cylinder to the base with care so that the cylinder sits on the filter in the center of the base; otherwise, it will leak. Tighten the cylinder firmly, yet carefully, so that the threads are not cross-threaded.

Test Procedure

Part 1:
1. Fill the cylinder to the 250–300 ml level with tap water.
2. Add 60 microliters of a commercially available, water-soluble OrePrep polypropylene glycol frother F-507 (100 ppm based on volume) with a microsyringe to the center of the water surface. Touch the end of the syringe on the side of the wall to ensure all frother is added. This procedure gives a reproducible froth.
3. Add tap water to bring the level up to 600 mi. Make sure any frother on the side of the cylinder is washed down.
4. Turn on air, which is introduced through the filter at the bottom of the cylinder and allow foam to build up to the 1000 ml level of the cylinder. The source of the air is a commercially available aquarium pump with a constant low-pressure airflow.
5. Add a predetermined amount of the defoaming composition to be tested onto the surface of the foam as close to the center as possible. If the defoaming composition is added near the side of the cylinder, the foam will cavitate at that side and the test result will be invalid.
6. At the same time the defoaming composition is added, a timer is started.
7. Record the foam height at 10, 20, 30 and 60 seconds.
8. Turn off the air.

Part 2:
1. After all foam has disappeared, turn on the air again and allow any foam to build up for 30 seconds. Record this foam height.
2. Turn air off.
3. Repeat steps 1 and 2.

The results of defoaming laboratory tests are presented in Tables I and II for various defoaming compositions. It should be noted that without any defoamer composition, the foam remained at the 1000 ml level of the cylinder or higher, for more than 10 minutes without faltering.

TABLE I

DEFOAMER LABORATORY TEST RESULTS

| Ex. No. | Defoamer | Dosage, ppm | Froth height in ml after indicated min. | | | | Froth height (ml) after stopping air and starting again | |
|---|---|---|---|---|---|---|---|---|
| | | | 10" | 20" | 30" | 60" | 1st try | 2nd try |
| 5 | D-202 | 10 | 320 | 240 | 240 | 240 | 220 | 230 |
| | | 20 | 320 | 250 | 240 | 170 | 160 | 180 |
| | | 33.3 | 190 | 70 | 30 | 30 | 30 | 30 |
| 6 | Example 1 | 16.7 | 250 | 100 | 150 | 150 | 170 | 190 |
| | | 33.3 | 100 | 50 | 70 | 70 | 60 | 60 |
| 7 | Ex. 1 with 5% Surfactant A | 16.7 | no froth in 10" | 0 | 0 | 0 | 50 | 50 |
| | | 33.3 | no froth in 5" | 0 | 0 | 0 | 40 | 40 |
| 8 | Example 2 | 16.7 | 230 | 130 | 100 | 110 | 130 | 140 |
| | | 33.3 | 120 | 80 | 50 | 50 | 160 | 70 |
| 9 | Ex. 2 with 5% Surfactant A | 16.7 | 60 | 0 | 0 | 0 | 30 | 30 |
| | | 33.3 | no froth in 7" | 0 | 0 | 0 | 20 | 20 |
| 10 | Example 3 | 16.7 | 240 | 180 | 160 | 150 | 140 | 140 |
| | | 33.3 | 220 | 160 | 90 | 90 | 110 | 110 |
| 11 | Ex. 3 with 5% Surfactant A | 16.7 | 210 | 160 | 140 | 160 | 170 | 150 |
| | | 33.3 | 150 | 140 | 120 | 125 | 100 | 90 |
| 12 | Example 4 | 16.7 | 290 | 240 | 190 | 160 | 180 | 180 |
| | | 33.3 | 220 | 180 | 140 | 120 | 130 | 130 |
| 13 | Ex. 4 with 5% Surfactant A | 16.7 | 180 | 150 | 80 | 110 | 120 | 120 |
| | | 33.3 | 150 | 80 | 70 | 100 | 110 | 120 |

TABLE II

DEFOAMER LABORATORY TEST RESULTS

| Ex. No. | Defoamer | Dosage, ppm | Froth height in ml after indicated min. | | | | Froth height (ml) after stopping air and starting again | |
|---|---|---|---|---|---|---|---|---|
| | | | 10" | 20" | 30" | 60" | 1st try | 2nd try |
| 14 | D-202 | 10 | 320 | 240 | 240 | 240 | 220 | 230 |
| | | 20 | 320 | 250 | 240 | 170 | 160 | 180 |
| 15 | D-204 | 10 | 40 | 40 | 30 | 40 | 50 | 180 |
| | | 20 | no froth in 8" | 0 | 0 | 0 | 20 | 80 |
| 16 | Example 1 with no Surfactant A | 10 | 290 | 220 | 190 | 180 | 220 | 220 |
| | | 20 | 120 | 60 | 60 | 70 | 70 | 90 |
| 17 | Ex. 1 with 1% Surfactant A | 10 | 210 | 160 | 150 | 150 | 170 | 180 |

TABLE II-continued

DEFOAMER LABORATORY TEST RESULTS

| Ex. No. | Defoamer | Dosage, ppm | Froth height in ml after indicated min. | | | | Froth height (ml) after stopping air and starting again | |
|---|---|---|---|---|---|---|---|---|
| | | | 10" | 20" | 30" | 60" | 1st try | 2nd try |
| | | 20 | 120 | 80 | 70 | 60 | 80 | 80 |
| 18 | Ex. 1 with 3% Surfactant A | 10 | 170 | 110 | 110 | 120 | 140 | 50 |
| | | 20 | 70 | 50 | 50 | 50 | 60 | 70 |
| 19 | Ex. 1 with 5% Surfactant A | 10 | 100 | 50 | 50 | 60 | 60 | 70 |
| | | 20 | 70 | 50 | 40 | 40 | 40 | 40 |
| 20 | Ex. 1 with 7% Surfactant A | 10 | 80 | 50 | 50 | 50 | 60 | 70 |
| | | 20 | no froth in 6" | 0 | 0 | 0 | 30 | 30 |
| 21 | Ex. 1 with 10% Surfactant A | 10 | 50 | 40 | 40 | 50 | 50 | 80 |
| | | 20 | no froth in 5" | 0 | 0 | 0 | 20 | 30 |
| 22 | Ex. 1 with 15% Surfactant A | 10 | no froth in 8" | 0 | 0 | 20 | 20 | 20 |
| | | 20 | no froth in 5" | 0 | 0 | 0 | 0 | 10 |

As may be seen from Tables I and II, the ranking of performance is as follows:

Ex.

7 Ex. 1 composition with non-ionic surfactant was better than:

9 Ex. 2 composition with non-ionic surfactant, which was much better than:

6 Ex. 1 composition without surfactant, which was much better than:

8 Ex. 2 composition without surfactant, which was much, much better than:

13 Ex. 4 composition with non-ionic surfactant, which was better than:

11 Ex. 3 composition with non-ionic surfactant, which was better than:

10 Ex. 3 composition without non-ionic surfactant, which was better than:

12 Ex. 4 composition without non-ionic surfactant.

EXAMPLES 23–26

PLANT EVALUATION OF STEARIC MONOESTER DEFOAMER BLENDS

From the above-listed ranking of the esters in the laboratory tests, it was determined that the stearic acid monoester in Example 1 was the best defoaming agent and further plant scale tests were conducted using this ester in four more compositions; Examples 23–26.

Example 23: Blend of stearic monoester with PPG from Example 1 with Surfactant A and mineral (white) oil.

Example 24: Blend of stearic monoester with PPG from Example 1 with Surfactant B (a nonyl phenol ethoxylate) and mineral (white) oil.

Example 25: Blend of stearic monoester with PPG from Example 1 with Surfactant A and 50% more mineral (white) oil than that used in Example 23.

Example 26: Blend of stearic monoester with PPG from Example 1 with Surfactant A and replacing an aromatic naphthalene solvent for the mineral (white) oil as the diluent.

These defoaming compositions were first tested at a Southwest Virginia coal preparation plant in a circuit with fine coal column flotation units. The hydrophobic coal fines in the froth concentrate stabilized the bubbles of the froth in the pump sump causing it to intermittently overflow. A commercially available high-molecular weight (over 2000 mole wt.) polyethylene glycol (PEG) was currently being used to control the froth.

The following consumption of the defoaming compositions were found to be necessary to control the overfroth situation at this plant:

- Current high molecular weight PEG defoamer: 310–520 ml/min.
- Example 23 composition: 160–240 ml/min.
- Example 24 composition: 300–480 ml/min.
- Example 25 composition: 280–450 ml/min.
- Example 26 composition: 220–280 ml/min.

The Example 1 composition also showed its effectiveness in a Michigan Upper Peninsula copper concentrator where within 20 seconds it destroyed a froth that was created by a spillage (overdose) of a high molecular weight PEG defoamer from a different company.

Many modifications may be made in the present invention without departing from the spirit and scope thereof which are defined only by the appended claims. For example, stearic acid esters which are not explicitly exemplified herein, but which nevertheless fall within the general definition thereof and which are made according to the method of this invention are expected to find utility. It is anticipated, as one of ordinary skill in the art can appreciate, that certain characteristics of the stearic acid esters of PPG of this invention will need to be matched with certain hydrocarbon diluents and optional surfactants to give the best defoaming performance. Further, it will be appreciated that defoaming performance will depend to some extent on matching the optimum defoaming composition with the mineral processing stream being treated. It will also be appreciated that the invention is not limited to particular streams to be treated, i.e, any stream with a foaming problem is anticipated as having the foam reduced to at least some extent with the composition of this invention.

We claim:

1. A method of reducing foam in a mineral separation process stream comprising adding to the mineral separation process stream a defoaming composition having:

a stearic acid monoester or diester of polypropylene glycol (PPG); and a hydrocarbon diluent.

2. The method of claim 1 where the PPG has a molecular weight based on hydroxyl equivalent weight, of from about 320 to about 700.

3. The method of claim 1 where the amount of defoaming composition added to the mineral separation process ranges from about 5 ppm to about 120 ppm.

4. The method of claim 1 where the proportion of ester to hydrocarbon diluent ranges from about 90/10 to about 20/80 by weight.

5. The method of claim 1 where the defoaming composition additionally comprises a dispersing surfactant.

6. The method of claim 5 where the defoaming composition additionally comprises from about 5 to about 10 wt. % of a non-ionic surfactant.

7. The method of claim 1 where the hydrocarbon is selected from the group consisting of mineral oil, cycloparaffinic, isoparaffinic and normal paraffinic hydrocarbons, aromatic naphthalene solvents, terpenic solvents, alpha-olefins, D-limonene, kerosene, mineral seal oil, and alcohols of at least ten carbon atoms.

8. A method of reducing foam in a mineral separation process stream comprising adding to the mineral separation process stream a defoaming composition having:

about 90 to about 20 wt. % of a stearic acid monoester or diester of polypropylene glycol (PPG);

about 20 to about 70 wt. % of a hydrocarbon diluent; and about 0 to about 20 wt. % of a non-ionic dispersing surfactant.

9. The method of claim 8 where the PPG has a molecular weight based on hydroxyl equivalent weight, of from about 320 to about 700.

10. The method of claim 8 where the amount of defoaming composition added to the mineral separation process stream ranges from about 5 ppm to about 120 ppm.

11. The method of claim 8 where the hydrocarbon is selected from the group consisting of mineral oil, cycloparaffinic, isoparaffinic and normal paraffinic hydrocarbons, aromatic naphthalene solvents, terpenic solvents, alpha-olefins, D-limonene, kerosene, mineral seal oil, and alcohols of at least ten carbon atoms.

12. A defoaming composition for reducing foam in a mineral separation process stream comprising:

a stearic acid monoester or diester of polypropylene glycol (PPG); and a hydrocarbon diluent.

13. The defoaming composition of claim 12 where the PPG has a molecular weight based on hydroxyl equivalent weight, of from about 320 to about 700.

14. The defoaming composition of claim 12 where the proportion of ester to hydrocarbon diluent ranges from about 90/10 to about 20/80 by weight.

15. The defoaming composition of claim 12 where the defoaming composition additionally comprises a dispersing surfactant.

16. The defoaming composition of claim 15 further comprising from about 5 to about 10 wt. % of a non-ionic surfactant.

17. The defoaming composition of claim 12 where the hydrocarbon is selected from the group consisting of mineral oil, cycloparaffinic, isoparaffinic and normal paraffinic hydrocarbons, aromatic naphthalene solvents, terpenic solvents, alpha-olefins, D-limonene, kerosene, mineral seal oil, and alcohols of at least ten carbon atoms.

18. A defoaming composition for reducing foam in a mineral separation process stream comprising:

about 90 to about 20 wt. % of a stearic acid monoester or diester of polypropylene glycol (PPG);

about 20 to about 70 wt. % of a hydrocarbon diluent; and about 0 to about 20 wt. % of a non-ionic surfactant.

19. The defoaming composition of claim 18 where the PPG has a molecular weight based on hydroxyl equivalent weight, of from about 320 to about 700.

20. The defoaming composition of claim 18 where the hydrocarbon is selected from the group consisting of mineral oil, cycloparaffinic, isoparaffinic and normal paraffinic hydrocarbons, aromatic naphthalene solvents, terpenic solvents, alpha-olefins, D-limonene, kerosene, mineral seal oil, and alcohols of at least ten carbon atoms.

* * * * *

UNITED STATES PATENT AND TRADEMARK OFFICE
CERTIFICATE OF CORRECTION

PATENT NO. : 5,545,351
DATED : August 13, 1996
INVENTOR(S) : William F. Riggs, et al.

It is certified that error appears in the above-indentified patent and that said Letters Patent is hereby corrected as shown below:

At column 2, line 49, delete "of" and insert -- or -- therefor.

At column 2, line 54, delete "nad" and insert -- and -- therefor.

At column 3, line 19, delete "]4" and insert -- 14 -- therefor.

At column 5, line 17, delete "mi" and insert --ml -- therefor.

Signed and Sealed this

Nineteenth Day of August, 1997

Attest:

BRUCE LEHMAN

*Attesting Officer*          *Commissioner of Patents and Trademarks*